United States Patent
Mardikar

(10) Patent No.: US 8,108,318 B2
(45) Date of Patent: Jan. 31, 2012

(54) TRUSTED SERVICE MANAGER (TSM) ARCHITECTURES AND METHODS

(75) Inventor: Upendra Mardikar, San Jose, CA (US)

(73) Assignee: eBay Inc., San Jose, CA (US)

( * ) Notice: Subject to any disclaimer, the term of this patent is extended or adjusted under 35 U.S.C. 154(b) by 275 days.

(21) Appl. No.: 12/339,850

(22) Filed: Dec. 19, 2008

(65) Prior Publication Data

US 2009/0307142 A1 Dec. 10, 2009

Related U.S. Application Data

(60) Provisional application No. 61/059,395, filed on Jun. 6, 2008, provisional application No. 61/059,907, filed on Jun. 9, 2008.

(51) Int. Cl.
*G06Q 20/00* (2006.01)

(52) U.S. Cl. ........... 705/65; 705/64; 705/67; 705/71; 705/72; 455/411; 455/410; 455/558; 382/115; 382/119; 340/5.2; 340/5.52

(58) Field of Classification Search ............. 705/50–79; 455/411, 410, 558; 382/115, 119; 340/5.2, 340/5.52
See application file for complete search history.

(56) References Cited

U.S. PATENT DOCUMENTS

| | | | |
|---|---|---|---|
| 6,269,348 B1 | 7/2001 | Pare, Jr. et al. | |
| 6,581,042 B2 * | 6/2003 | Pare et al. | 705/40 |
| 7,512,567 B2 * | 3/2009 | Bemmel et al. | 705/67 |
| 7,543,156 B2 * | 6/2009 | Campisi | 713/186 |
| 7,844,082 B2 * | 11/2010 | Baentsch et al. | 382/115 |
| 7,877,605 B2 * | 1/2011 | Labrou et al. | 713/168 |
| 7,917,769 B2 * | 3/2011 | Campisi | 713/186 |
| 2004/0059923 A1 * | 3/2004 | ShamRao | 713/186 |
| 2005/0171898 A1 | 8/2005 | Bishop et al. | |
| 2005/0240778 A1 * | 10/2005 | Saito | 713/186 |
| 2005/0273609 A1 * | 12/2005 | Eronen | 713/171 |
| 2006/0265743 A1 * | 11/2006 | Kusunoki et al. | 726/21 |
| 2007/0019622 A1 * | 1/2007 | Alt et al. | 370/352 |
| 2007/0022058 A1 * | 1/2007 | Labrou et al. | 705/67 |
| 2007/0033149 A1 * | 2/2007 | Kanngard et al. | 705/65 |
| 2007/0092112 A1 * | 4/2007 | Awatsu et al. | 382/115 |
| 2007/0219926 A1 * | 9/2007 | Korn | 705/67 |
| 2008/0065885 A1 | 3/2008 | Nagai et al. | |
| 2009/0164799 A1 * | 6/2009 | Takagi | 713/186 |
| 2009/0191846 A1 * | 7/2009 | Shi | 455/411 |
| 2010/0117791 A1 * | 5/2010 | Inoue et al. | 340/5.52 |
| 2011/0179284 A1 * | 7/2011 | Suzuki et al. | 713/186 |

* cited by examiner

*Primary Examiner* — Mamon Obeid

(74) *Attorney, Agent, or Firm* — Haynes and Boone, LLP

(57) ABSTRACT

A client device comprises a first secure element and a second secure element. The first secure element comprises a first computer-readable medium having a payment application comprising instructions for causing the client device to initiate a financial transaction. The second secure element comprises a second computer-readable medium having a security key, a payment instrument, stored authentication data and instructions for generating a secure payment information message responsive to the payment application. The secure payment information message comprises the payment instrument and is encrypted in accordance with the security key.

5 Claims, 9 Drawing Sheets

TRUSTED SERVICE MANAGER (TSM) ARCHITECTURES AND METHODS

RELATED APPLICATIONS

This application claims priority to U.S. Provisional Application Ser. No. 61/059,395 filed on Jun. 6, 2008, and U.S. Provisional Application Ser. No. 61/059,907 filed on Jun. 9, 2008, the contents of which are hereby incorporated by reference in their entirety.

BACKGROUND

1. Technical Field

Embodiments of the present disclosure generally relate to financial transactions and more particularly to secure financial transactions initiated from an electronic device.

2. Related Art

"Contactless technology" refers to short distance communications between two devices that are not physically connected. A wide, variety of "contactless technology" exists today. Near Field Communication (NFC) is a specific type of "contactless technology" that is of high importance to Mobile Network Operators (MNOs) and to Service Providers (SP), for example, banks. NFC is a short-range high frequency wireless communication technology that enables the exchange of data between devices typically over about a 10 centimeter (or about 4 inch) distance, thus providing a fast, simple and secure way for a user to experience a range of contactless services with a mobile device.

Wireless mobile devices that include an NFC device and a smart card, which may use an RFID for identification purposes, allow a person to make financial transactions, such as purchasing a retail item. Typically, a consumer waves or taps the wireless mobile NFC device on a reader to effect a monetary transfer, and a price of the item is deducted from a total amount that is available and stored on the smart card of the wireless mobile device. Optionally, the amount of the item may be forwarded to a server that can identify the identification code of the particular device and subsequently charge the person for the purchase of the retail item. Such NFC-based point of sale (POS) transactions provide advantages such as eliminating the need to carry cash and enabling a faster financial transaction.

In addition to NFC based POS payments, there are several prevalent models of payments in the mobile industry including Short Message Service (SMS), a communications protocol that allows the interchange of short text messages between mobile devices, and Mobile Internet-based payments, by which customers search for and purchase products and services through electronic communications with online merchants over electronic networks such as the Internet. In this regard, individual customers may frequently engage in transactions with a variety of merchants through, for example, various merchant websites. A credit card may be used for making payments over the Internet. A disadvantage of credit card usage is that online merchants may be exposed to high fraud costs and "chargeback fees," bearing liability because there is no credit card signature with an online sale.

Using mobile devices, for example personal electronic devices, to make financial transactions involving a transfer of funds from an SP to a vendor via an MNO network using SMS, NFC at the POS and Mobile Internet-based transactions create security issues or problems. For example, such methods involve credit card/financial instrument information, a user name and a password flowing through the network. In addition, a user may, at different times, use several different payment applications for different Service Providers. To the extent that each payment application has its own, separate security registration and verification procedures, the user experience may be cumbersome in that a user must separately load and run separate dedicated applications, each of which must be separately registered and verified for making secure financial transactions. Moreover, the security of each of these applications may be compromised by viruses, Trojans, key loggers and the like since the applications and their security information may be resident on the same data storage element. Moreover, unique biometric identifying information, for example a thumb or finger-print read from a biometric reader on the device, may be captured by any of the several applications loaded on the device. Additional security measures may be desirable to enable more secure Service Provider/Vendor financial transactions over a network or networks.

Mobile payment services using SMS communication may be insecure or use cumbersome security measures. For example, one method involves using an interactive voice response (IVR) call to call back for a PIN. This approach, used for example in PayPal Mobile 1.x, may result in a less-than-optimal user experience for users who may not want to be burdened with entering the PIN. Other approaches involve key management in the software and/or downloading client applications (e.g. interfaces available from kryptext.co.uk and Fortress SMS).

SUMMARY

According to one embodiment, a client device comprises a first secure element and a second secure element. The first secure element comprises a first computer-readable medium having a payment application comprising instructions for causing the client device to initiate a financial transaction. The second secure element comprises a second computer-readable medium having a security key, a payment instrument, stored authentication data and instructions for generating a secure payment information message responsive to the payment application. The secure payment information message comprises the payment instrument and is encrypted in accordance with the security key.

These and other features and advantages of the present invention will be more readily apparent from the detailed description of the embodiments set forth below taken in conjunction with the accompanying drawings.

Figure 1:
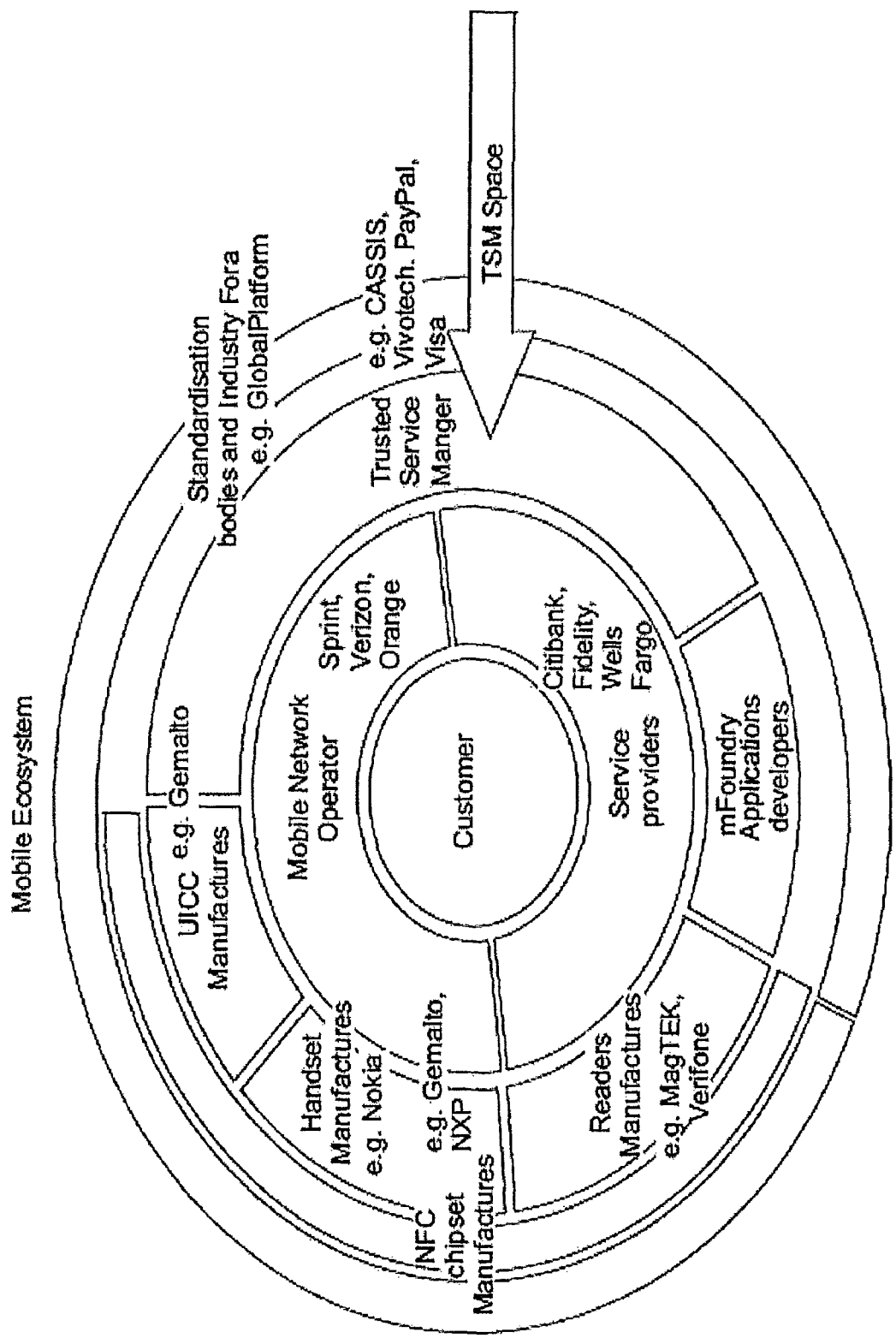
FIG. 1 illustrates a block diagram of an ecosystem or environment for making financial transactions over a network.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure relate to systems and methods for making secure financial transactions over a network. A user may use a client device, for example a personal electronic device, to make a payment from a Service Provider to a merchant/vendor or other payee. The device may include at least two separate secure elements (SEs), one dedicated to running various Service Provider applications (App SE) and another dedicated to providing security for the applications and financial transactions (Crypto SE). The device may include a biometric sensor for providing biometric information to the Crypto SE to provide transactional security for transactions conducted from the device. The device may provide other means of authentication for non-repudiation of a transaction, including a secure payment mode, in which security information or personal identifier number (PIN) may be securely tunneled directly to the Crypto SE, without otherwise being stored or captured on the device or elsewhere. A trusted service manager (TSM) may enable secure SMS communication between and among the user device, the MNO and the Service Providers. The device may be capable of near field communication (NFC) and may be capable of making secure financial transactions at an NFC point of sale (POS).

FIG. 1 illustrates an example embodiment of an "Ecosystem" or environment in which various embodiments of this disclosure may be used. The ecosystem may comprise or involve any number of various parties. One such ecosystem has been developed by the Global System for Mobile communication Association (GSMA), a global trade association representing over 700 GSM mobile phone operators throughout the world. See "Mobile NFC Services," GSMA, Version 1.0, February 2007. A mobile ecosystem may include various parties, including:

Customer—the customer subscribes to a Mobile Network Operator (MNO) and a service provider and is a customer of a merchant/vendor. The customer may be an individual or a company.

Mobile Network Operator (MNO)—the MNO provides a full range of mobile services to the Customer. Also, the MNO may provide UICC and NFC terminals plus Over the Air (OTA) transport mechanisms. Examples of MNOs include Sprint, Verizon, and ATT.

Service Provider (SP)—the SP provides contactless services to the Customer. Examples of SPs include banks, credit card issuers as well as public transport companies, loyalty programs owners, etc.

Retailer/Merchant—the retailer/merchant may operate an NFC capable point of sales terminal with an NFC reader.

Trusted Service Manager (TSM)—the TSM securely distributes and manages NFC applications and may have, for example, a direct relation or a relation via clearing houses to SPs.

Handset, NFC Chipset and UICC Manufacturer—the manufacturers produce mobile NFC/communication devices and the associated UICC hardware.

Reader Manufacturer—the reader manufacturer makes NFC reader devices.

Application Developer—the application developer designs and develops mobile NFC applications.

Standardization bodies and industry fora—develop a global standard for NFC, enabling interoperability, backward compatibility and future development of NFC applications and services.

NFC-based financial transactions may require cooperation among the various players of the ecosystem. Each player may have its own expectations, for example, the Customer expects convenient, friendly and secure services within a trusted environment; the SPs want their applications to be housed and used in as many mobile devices as possible; and the MNOs want to provide new mobile contactless services that are secure, high quality and consistent with the existing services experienced by the Customer. But although each player may have its own culture and expectations, they all have the same basic requirement—the need for security and confidentiality.

The Trusted Service Manager (TSM), in particular, may help bring trust and convenience to the complex, multi-player NFC ecosystem. The TSM role includes providing a single point of contact for the SPs, e.g., banks, to access their customer base through the SOs, and to provide secure download and lifecycle management for mobile NFC applications on behalf of the SPs. The TSM may not disrupt the SP's business model as the TSM may not participate in the transaction stage of the service.

Figure 2:
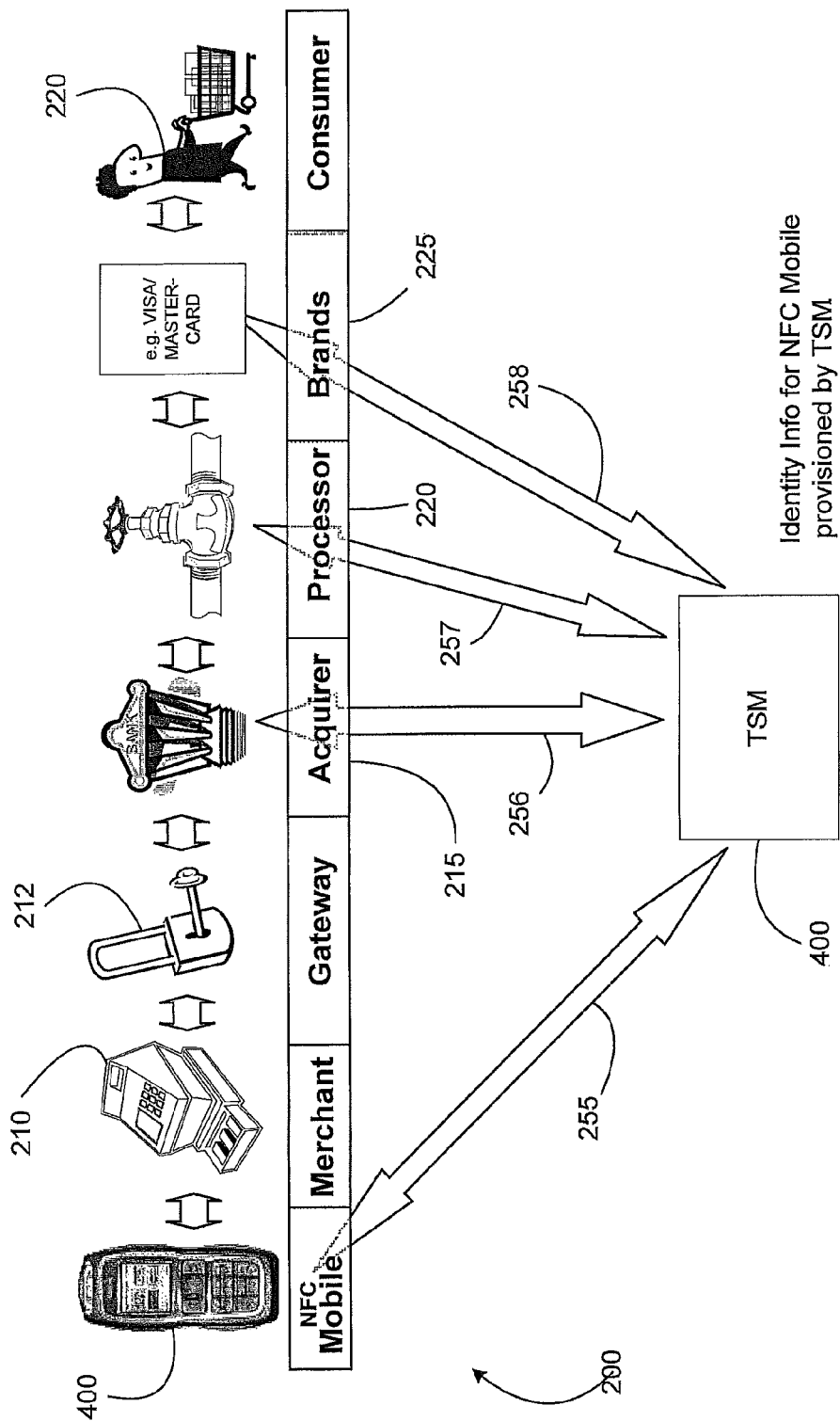
FIG. 2 illustrates a payment system according to an example embodiment of the present disclosure.

FIG. 2 illustrates a payment system 200 according to an embodiment of the present disclosure. A financial transaction using, for example, an NFC based Point of Sale (POS) payment system, may be made using a client device 400 (see FIG. 4) such as an NFC enabled mobile device through a retailer or merchant server 210. It should be appreciated that although an NFC application is illustrated in this embodiment, the system is not limited to NFC applications, but may also apply to other types of applications, for example, SMS, mobile internet or other forms of communication.

Client device 400 may be implemented using any appropriate combination of hardware and/or software configured for wired and/or wireless communication over a network. For example, in one embodiment, client device 400 may be implemented as a personal computer of a user 220 (also referred to as a "customer" or "consumer") in communication with the Internet or another network. In other embodiments, client device 400 may be implemented as a wireless telephone, personal digital assistant (PDA), notebook computer and/or other types of electronic computing and/or communications devices. Furthermore, client device 400 may be enabled for NFC, Bluetooth, online, infrared communications and/or other types of communications.

Client device 400 may include various applications as may be desired in particular embodiments to provide desired features to client device 400. For example, in various embodiments, applications may include security applications for implementing client-side security features, programmatic client applications for interfacing with appropriate application programming interfaces (APIs) over a network, or other types of applications.

Client device 400 may further include one or more user identifiers that may be implemented, for example, as operating system registry entries, cookies associated with a browser application, identifiers associated with hardware of client device 400, or other appropriate identifiers. Identifiers associated with hardware of the client device 400 may be, for example, the International Mobile Equipment Identity number (IMEI #) or the Secure Element ID number. In one embodiment, a user identifier may be used by a payment service provider or TSM 240 to associate client device 400 or user 220 with a particular account maintained by payment service provider 240 as further described herein.

Merchant server 210 may be maintained, for example, by a retailer or by an online merchant offering various products and/or services in exchange for payment to be received over a network such as the Internet. Merchant server 210 may be configured to accept payment information from user 220 via, for example, client device 400 and/or from a TSM 240 over a network. It should be appreciated that although a user-merchant transaction is illustrated in this embodiment, the system may also be applicable to user-user, merchant-merchant and/or merchant-user transactions.

Merchant server 210 may use a secure gateway 212 to connect to an acquirer 215. Alternatively, merchant server 210 may connect directly with acquirer 215 or processor 220. Once verified, acquirer 215, which has a relation or subscription with payment service provider 240, processes the transaction through processor 220 or TSM 240. Brands 225, for example, payment card issuers, which also have a relation or subscription with the TSM 240, are then involved in the payment transaction which will enable user 120 to finalize the purchase.

TSM 240 may have data connections 255, 256, 257 and 258 with subscriber client device 400, subscriber acquirer 215, subscriber processor 220, and/or subscriber brand 225, respectively, to communicate and exchange data. Such data connections 255, 256, 257 and 258 may take place, for example, via SMS or a Wireless Application Protocol (WAP) over a network. In addition, according to one or more embodiments, payment service provider 240 may have a data connection or connections (not shown) with subscriber Internet companies, Internet mortgage companies, Internet brokers or other Internet companies (not shown).

Figure 3:
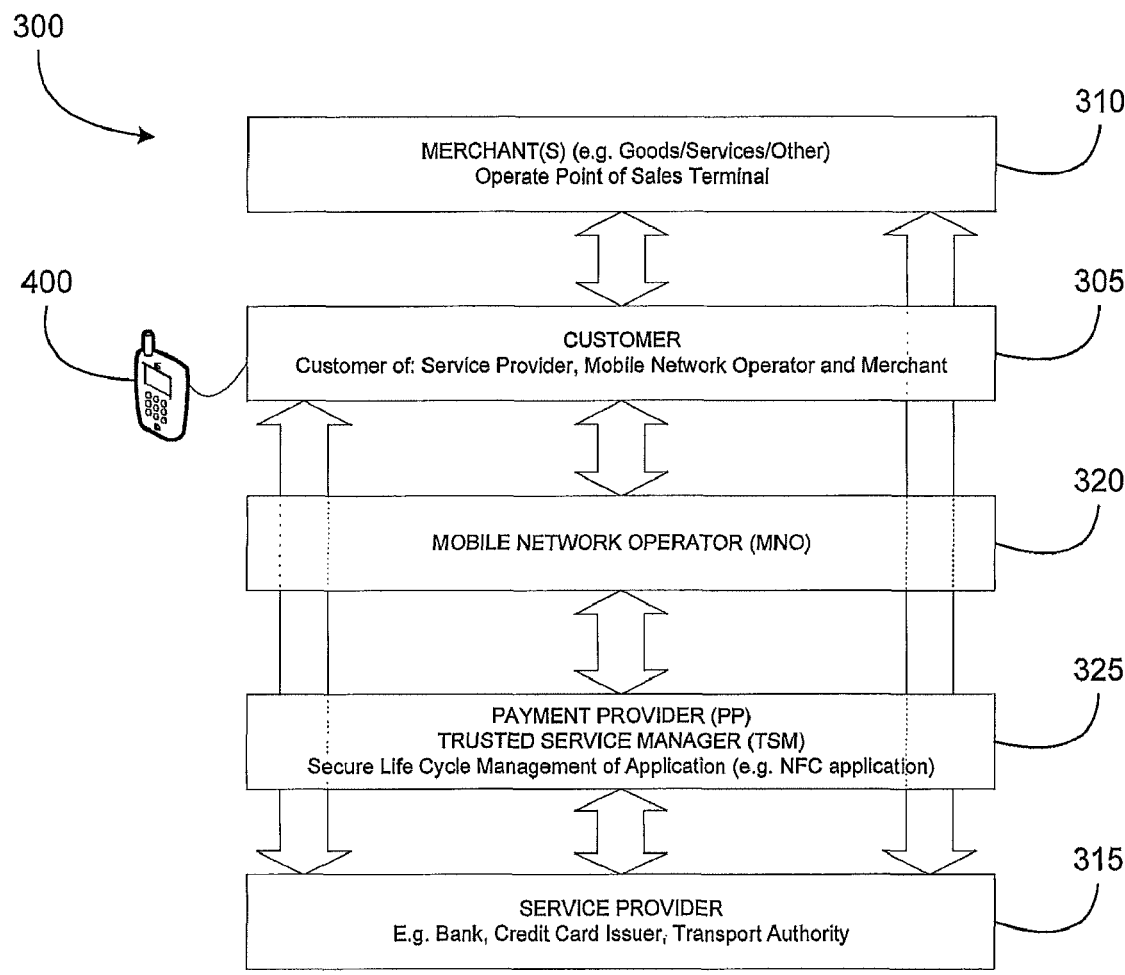
FIG. 3 illustrates a block diagram of an overview of an example embodiment of a system for conducting a purchase transaction between a customer/user and a merchant/service provider, paid for by making a financial transaction using a financial Service Provider.

FIG. 3 illustrates a block diagram illustrating an overview of an example embodiment of a system 300 for conducting a purchase transaction between a customer/user 305 and a merchant/service provider 310, paid for by making a financial transaction using a financial Service Provider 315. The overview illustrates the relationships and roles of the various participants in such a transaction. Customer 305 may use device 400 (FIG. 4) that communicates over a network via a Mobile Network Operator (MNO) 320, for example Sprint, Verizon or other mobile network service providers. Customer 305 may desire to purchase or pay for goods or services provided by merchant/service provider 310. The customer 305 may desire to make the payment by using financial services provided by SP 315.

In an example embodiment, a Trusted Service Manager (TSM) 325 may provide a single point of contact for Service Provider 315, or providers, to access their customers 305 through any of various MNOs 320. The TSM 325 may manage the secure download and life-cycle management of the mobile payment applications 450 (FIG. 4), for example NFC applications, on behalf of the Service Providers 315. Although an NFC is illustrated and generally discussed herein with regard to various embodiments, the TSM's role or the role of other entities discussed herein is not limited to NFC and can be applied to other types of electronic communication including technologies such as Bluetooth, infrared, SMS (Short Message Service), and/or other wireless or contactless technologies.

A central issue with mobile NFC or other wireless technology is the need for cooperation among the many involved parties to meet the needs of the customer via secure over-the-air (OTA) link. The payment provider system may act as the TSM 325 to provide a single point of contact for the service provider to access their customer base through the MNOs 320. More specifically, with the ever changing electronic communications environment including the emergence of NFC, service providers 315 may not be ready or willing to change their working methods or the functions they provide, but they may still want to participate in the new mode of service operation by enhancing the services they offer while maintaining existing core processes. This conflict is solved by the TSM 325 who may help service providers securely distribute and manage contactless services for their customers using the MNOs 320. In this regard, the TSM may manage the secure download and life-cycle management of the mobile NFC applications on behalf of the service providers.

In an example embodiment, the duties or roles of one or more involved parties may be combined and preformed by a single entity. For example, service providers 315, banks, or other financial institutions are those entities that typically issue credit and provide authorization for conducting financial transactions between the customer and the merchant. TSM 325 may act as a payment provider system (PP), such as PayPal, and may provide payment processing for online transactions on behalf of the customer so that the customer does not expose payment information directly to the merchant. Instead, the customer may pre-register his account with the payment provider system, map the account to an email address, and then use the payment provider system to make purchases when redirected to the payment provider system from the merchant's site. After the financial transaction is authorized, the TSM 325 or payment provider system completes the transaction.

In online and/or contactless financial transactions, the role of the TSM 325 or payment provider system may be expanded to include or share duties generally associated with the service provider 315 such that customers may use the payment provider system as a credit issuer, and for services such as electronic bank transfers from one account to another account, and/or provide access to other related financial activities through electronic communications over electronic networks operated by the MNO 320, such as the Internet. The payment provider system may provide an infra-structure, software, and services that enable customers and merchants to make and receive payments.

Client Device

Figure 4:
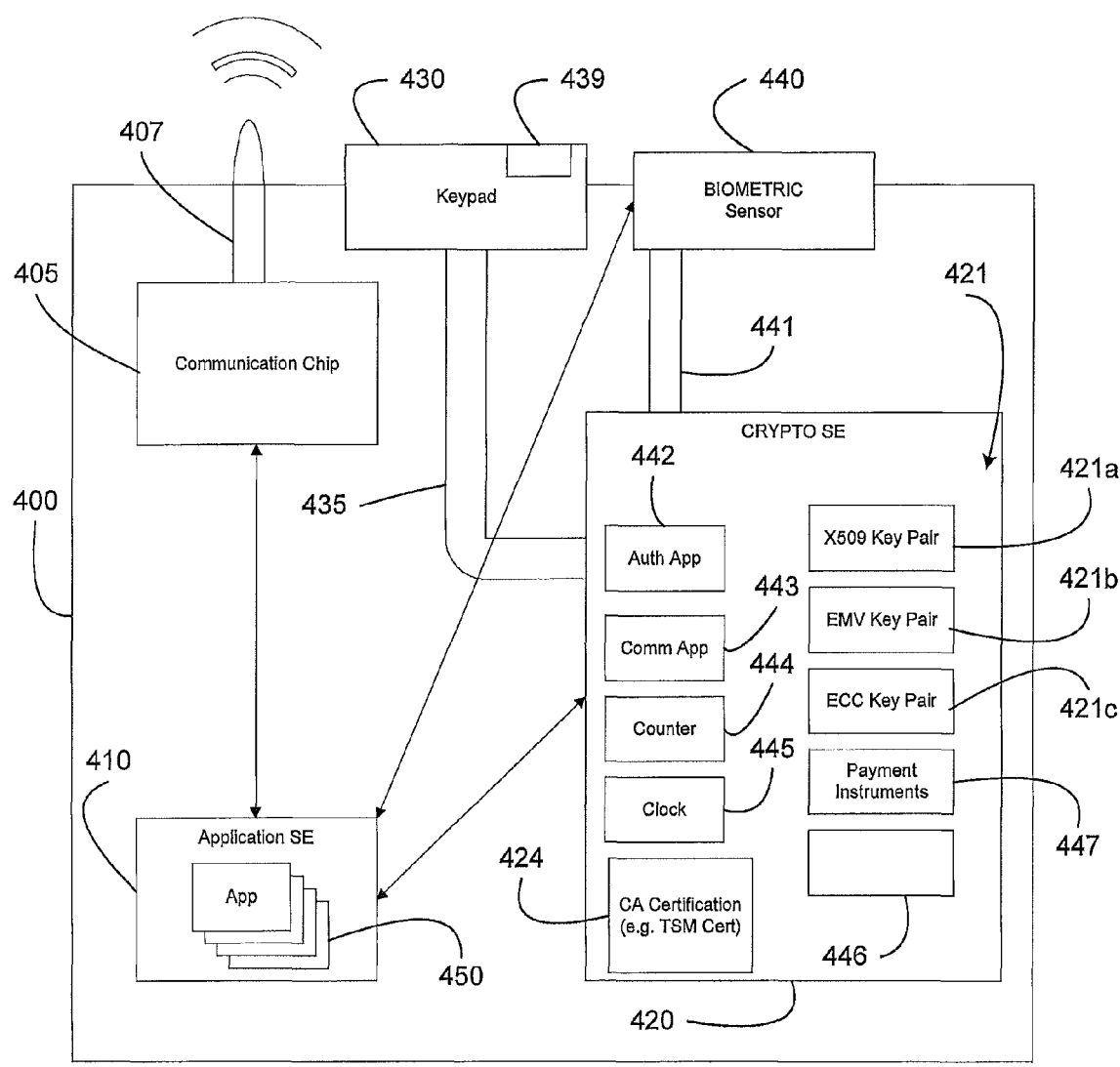
FIG. 4 is a block diagram of an exemplary embodiment of a client device.

FIG. 4 shows an example embodiment of a block diagram of a client device 400, for example a communications device such as a mobile phone, cellular phone, personal digital assistant (PDA) or other contactless, electronic communication device. The client device 400 may include a communication chip 405, an antenna 407, secure elements 410, 420, a keypad 430 and a biometric sensor 440.

In an example embodiment, the communication chip 405 may support one or more modes of communication, including, for example, Near Field Communication (NFC), Bluetooth, infrared, GSM, UMTS and CDMA cellular phone protocols, SMS and Internet access via a mobile network or local network, for example WAP and/or other wireless or contactless technologies. Near Field Communication is a short-range, high frequency, wireless communication technology which enables the exchange of data between devices over about a very short distance, for example around four inches. NFC may be an extension of the ISO 14443 proximity-card standard, for example contactless card or RFID, and may combine the interface of a smart card and a reader into a single device. An NFC device may communicate with both existing ISO 14443 smart cards and readers, as well as with other NFC devices, and may be compatible with existing contactless infrastructure already in use for public transportation and payment. For example, the device 400 may be compatible with Near Field Communication Point of Sale devices (NFC POS) located at the point of sale at a vendor's place of business.

In an example embodiment, the keypad 430 may include any form of manual key press or touch sensor or other means of inputting information to the device, for example a telephone touch-pad, qwerty or qwertz full or partial keyboard or any other arrangement of input buttons, physical or displayed on a touch screen device, which may be pressed or selected in sequence to input characters, numbers or letters indicative of a PIN. The keypad may include a "Payment Mode" button 439 for placing the device 400 into a payment mode, for example a secure payment mode, for making NFC POS transactions. The "Payment Mode" button may be on the keyboard 430 or anywhere else on the device, or may be on a remote control device coupled with the device for input to the device. In an example embodiment, the secure payment mode may be used even though the telephone communication mode is turned off, for example in an airplane or other location where cell phones are required or requested to be silenced or turned off. In an example embodiment, tunneling circuitry 435 may provide for input directly, without otherwise being stored or captured on the device or elsewhere, to the Crypto or Payment SE 420 (discussed below) when in the secure payment mode, in order to provide secure entry of passwords or PINs during a financial transaction.

Biometric Sensor

In an example embodiment, the biometric sensor 440 may be any sensor that provides data representative of a unique, biological user attribute that may be used to identify a user, for example a finger/thumb-print sensor, retina scan or voice identifier. In this description, the term biometric "sensor" 440 is used to refer not just to the physical sensor that receives the raw biometric data, but to the arrangement of sensor, logic, algorithms and the like that collectively sense, measure, evaluate and generate a data signal or signals representative of the user's biometric signature. The biometric signature data from the biometric sensor 440 may be tunneled through a biometric tunneling circuit 441, directly to the Crypto SE 420 (discussed below), without being captured by any application on a separate App SE 410 (discussed below). The biometric signature may be stored as authentication data 446 on the Crypto SE 420.

Secure Elements

In an example embodiment, the device 400 may include at least two Secure Elements (SEs) 410, 420. An SE may be, for example, a smart card, for example a Universal Integrated Circuit Card (UICC) or smart-card like chip embedded inside device 400, for example inside of a cell phone. A smart card is a small, relatively tamper-proof computer. The smart card itself may contain a CPU and some non-volatile storage. In most cards, some of the storage may be tamper-proof while the rest may be accessible to any application that can talk to the card. This capability makes it possible for the card to keep some secrets, such as the private keys associated with any certificates it holds. The card itself may perform its own cryptographic operations.

SE 410, 420 may include data storage and may be preloaded with applications and/or may be capable of downloading various applications, for example applications for facilitating financial transactions over a network, key pairs, payment instruments and/or a Certifying Authority (CA) certificate.

In an example embodiment, each SE 410, 420 may have logical, end-to-end security. For example, there may be an authenticated and encrypted channel for communication with the SE. In an example embodiment, an SE may have physical security. For example, an SE may adhere to certain security standards, for example, FIPS 140-2 Level 3 (tamper proof and copy protection) and Common Criteria ISO 15408 EAL 4+, or other standard as required or desired.

In an example embodiment, SE 410, 420 may be global. In other words, an SE may be compatible with a variety of communications protocols or systems. For example, a device may be compatible with GSM, UMTS and/or CDMA cellular phone protocols.

In an example embodiment, SE 410, 420 may be portable, in that it may be easily transferred from one device 400 to another. This may be achieved, for example, by porting the SE 410, 420 or by having Trusted Service Manager (TSM) 325 (FIG. 3) port the applications. Portability may enable a user who has registered his/her device 400 to register any other devices of that user. For example, a user may have one phone for business and one for home, where transactions from each phone are specifically for business or personal use.

In an example embodiment, SE 410, 420 may be compatible with Over-The-Air (OTA) loading or dynamic remote management. For example, applications resident in the App SE may be compatible with OTA management for life cycle management of the applications. For example, resident applications may be managed, updated, altered, and/or fixed to avoid newly discovered vulnerabilities in the applications or update the application to add or change features.

In an example embodiment, SE 410, 420 may be standardized. For example, they may be compatible with standards set out by a known standards or protocols, for example those established by GlobalPlatform.org and/or Bearer Independent Protocol.

In an example embodiment, an SE may work even when the device is turned off. For example, an NFC communication mode may permit a device to make NFC POS transactions or purchases even when a phone's other cellular and/or wireless communication modes are turned off or disabled. This may be particularly desirable and/or convenient in situations where the device is turned off or when the device must be turned off, for example when on an airplane or other location where electronic devices may be required to be turned off. In an example embodiment, secure payment mode button 439 may be used to switch on or prepare the NFC payment components for making an NFC payment without powering up other communications modes. The lower-power, short range of NFC communications may be permissible even where higher power/longer range communications modes are undesirable.

Separate Secure Elements

In an example embodiment, the device may have more than one SE, for example two SEs 410, 420. One SE may be referred to as an Application SE (App SE) 410 and a separate SE may be referred to as a payment, credential, wallet or crypto SE 420 (Crypto SE) (throughout this description, the term "Crypto SE" is used to refer to any one of payment, credential, wallet or crypto SE, unless otherwise specified). Splitting the App SE 410 from the Crypto SE 420 may enable certifying a particular device 400 for use just once, through the Crypto SE, while permitting changes to be made to the App SE, changes that may not require additional certification or re-certification since the security and certification information is kept securely on a separate Crypto SE 420.

App SE

In an example embodiment, the App SE 410 may be designated for and arranged for storing various, resident financial transaction or payment applications 450, each of which may facilitate financial transactions for a different financial Service Provider. Applications 450 may include, for example, a PayPal application or other payment applications provided by alternate service providers and which facilitate financial transactions over a network.

The App SE 410 may be, for example, a SIM card. A SIM card may securely store a service-subscriber key (IMSI) used to identify a subscriber. The SIM card allows users to change phones by simply removing the SIM card from one mobile phone and inserting it into another mobile phone or broadband telephony device. The App SE may not include any payment instruments, certificates, keys, certificates or credentials, all of which may be stored in the separate Crypto SE 420. The App SE 410 may be a dynamic SE, on which applications may be dynamically managed and changed, for example through OTA management. All applications 450 may be signed by a common Trusted Service Manager (TSM) public key. The App SE applications may have virtual environments (like MFC smart cards).

In an example embodiment, applications 450 may include instructions for periodically checking whether an update to the application is available. If the update is available and customer is registered, apps are downloaded and signature is verified. Once the signature is matched, the new application is activated.

OTA Management

In an example embodiment, the applications 450, for example mobile financial services applications, may be managed over the air (OTA). The OTA management may be securely provided by the TSM for multiple service providers. An App SE may be shared by more than one such application 450 for various SPs. The SPs may desire that the services that they provide via their applications 450 be Secure, Isolated, under their control, have a Life Cycle that they dictate for their respective applications, and be certified. In an example embodiment, OTA updates, upgrades or other changes for the Apps 450 may require a signature by the TSM public key.

Crypto SE

In an example embodiment, the Crypto SE 420 may be designated for and arranged for loading and storing authentication data 446 (for example a PIN or biometric signature), payment instruments 447, certificates 424, crypto keys 421 and other security-related information, including, for example, unique biometric authentication information related to a specific user. The Crypto SE may be primarily static, although certain credentials or other sensitive data may be dynamic. The Crypto SE 420 may provide verification and authentication for multiple applications stored in the App SE 410.

Splitting the App SE from the Crypto SE may enable a single Trusted Service Manager to verify and authenticate the identity of a user for each of a number of various Service Providers. Splitting the Crypto SE 420 from the App SE 410 may improve user experience by reducing the necessity of registering and verifying various applications 450 separately for each Service Provider and/or re-certification after any changes to any of the applications 450. Splitting the Crypto SE from the App SE 410 may also reduce the likelihood of security information on the Crypto SE 420 being compromised by viruses, Trojans, key loggers and the like that may find their way onto the App SE 410.

An authentication application 442, for example a biometric authentication application, may reside on the Crypto SE 420 and may evaluate the biometric data and compare the data to data from a registered user, or may register the data where the data is being collected as part of a registration or certification procedure.

The Crypto SE 420 may also have a communication application 443, a counter 444 and a clock 445. The communication application 443 may enable or control communication by the SE. A counter 444 and a clock 445 may be used to identify and/or timestamp particular communications to prevent against replays.

In an example embodiment, the Crypto SE 420 may be certified, for example by a credit processing company such as MasterCard or VISA. The Crypto SE may be certified, for example, using the biometric sensor 440 and biometric authentication application 442. Once the Crypto SE portion is certified, the device 400 is certified for use. Additional financial applications 450 may be added or updated on the App SE without any additional certification or recertification requirement. As a result, the user experience may be enhanced by minimizing the number of times that a user must register or certify his device 400 and/or new or updated applications 450 on his device 400. This is because the App SE is split or separated from the Crypto SE.

In an example embodiment, Crypto SE 420 may include one or several key-pairs, for example an X509 key-pair 421*a*, EMV (Europay, MasterCard, VISA) key-pair 421*b* or ECC key-pair 421*c*. The key-pair or pairs may be pre-loaded on the Crypto SE 420. A Trusted Service Manager credential 424 or certificate, for example a Root Certificate of Authority (CA) may also be pre-loaded on the Crypto SE 420.

Public Key Infrastructure

In cryptography, a public key infrastructure (PKI) is an arrangement that binds public keys with respective user identities by means of a certificate authority (CA). The user identity must be unique for each CA. The binding is established through the registration and issuance process which, depending on the level of assurance the binding has, may be carried out by software at the CA. A Registration Authority (RA) assures this binding. For each user, the user identity, the public key, their binding, validity conditions and other attributes are made unforgeable in public key certificates issued by the CA. In an example embodiment, a Trusted Service Manager (TSM) may act as the CA and may work with the device and/or chip manufacturers to preload the Root Certificate of Authority (CA) 424 on a client device 400, for example on the Crypto SE 420 of the device.

Registration

Figure 5A:
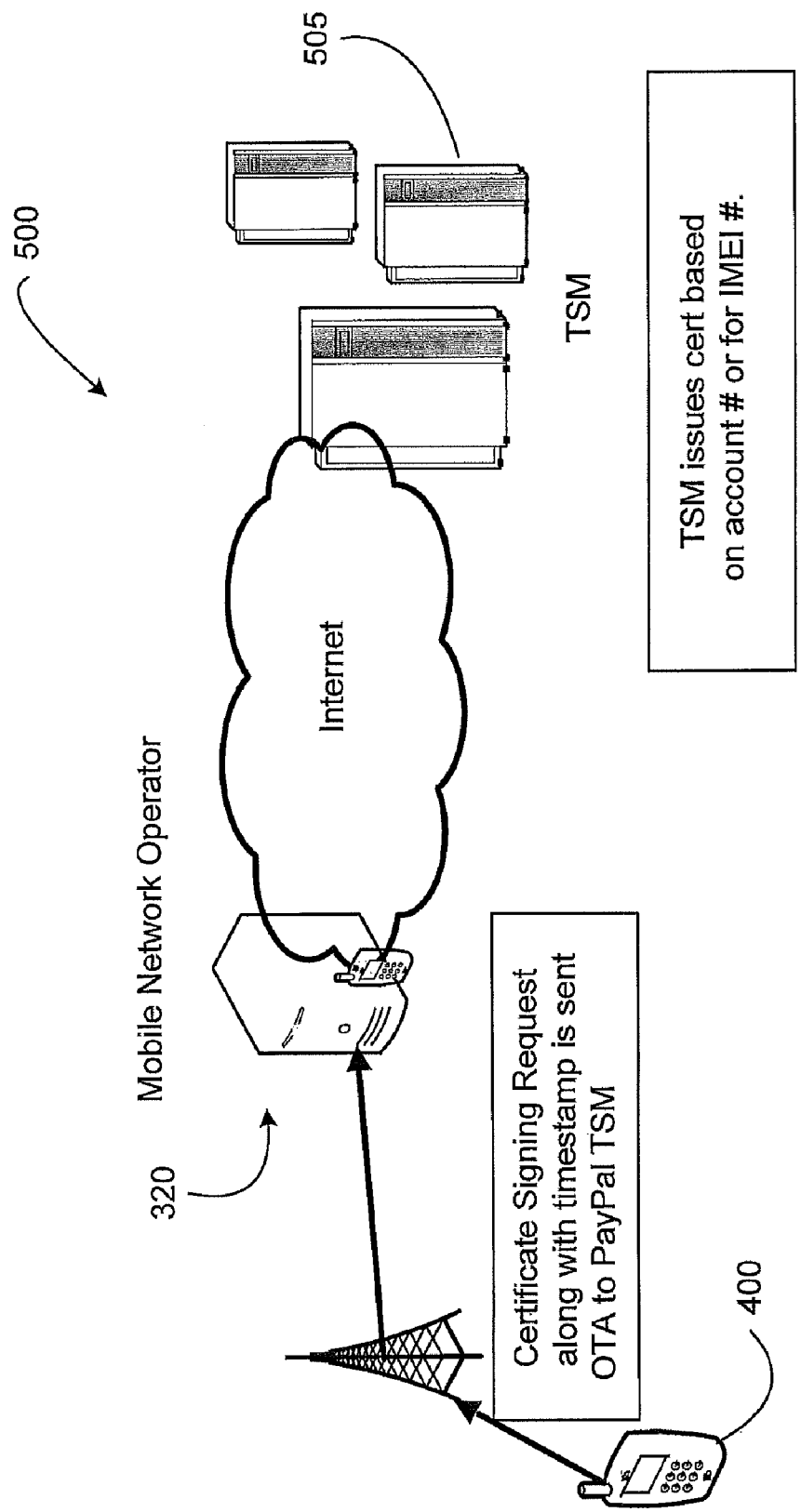
FIGS. 5a and 5b illustrate an exemplary system for registering a client device.
Figure 5B:
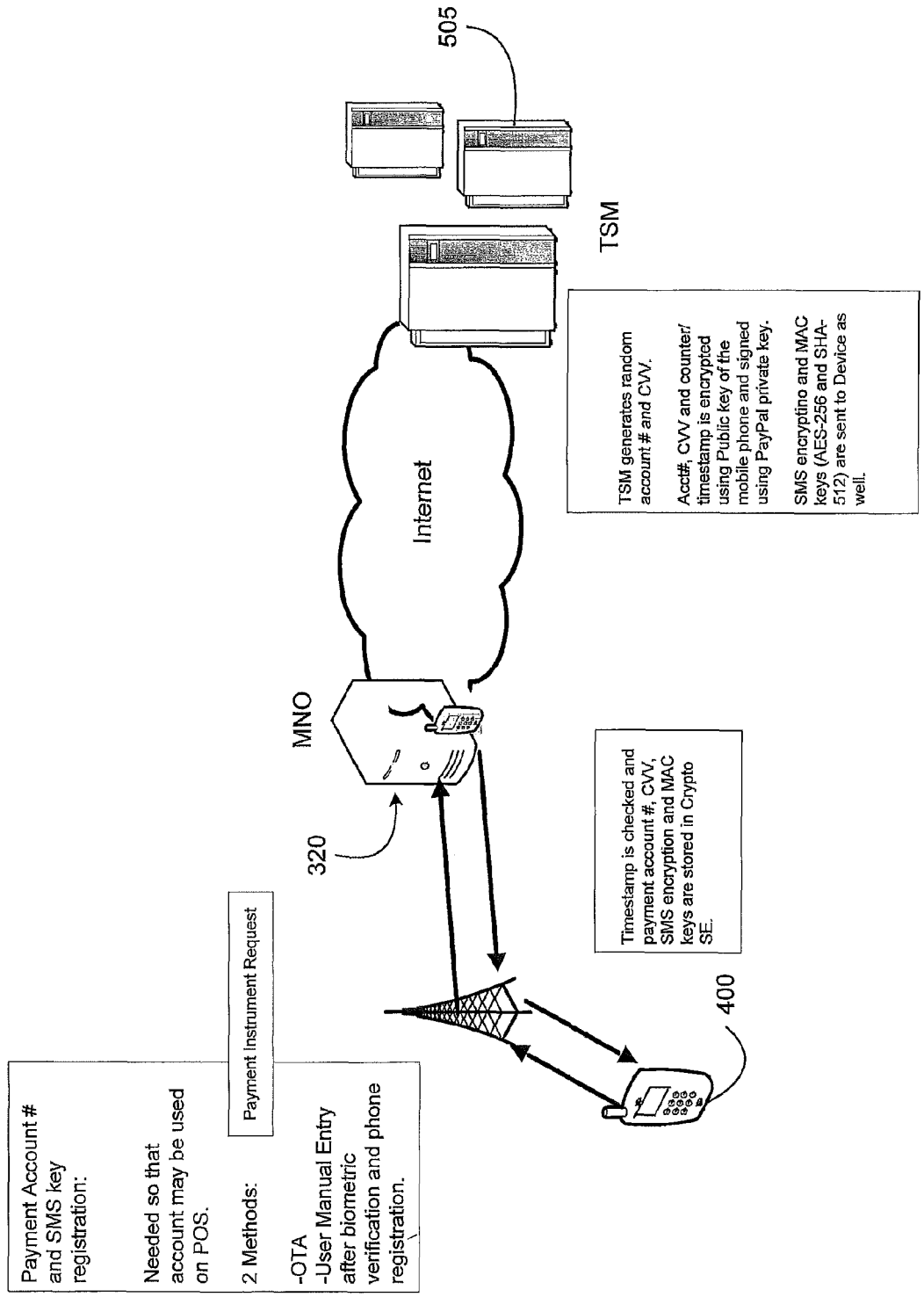

FIGS. 5*a* and 5*b* illustrate an exemplary system 500 for registering client device 400. In an example embodiment, a device user may be required to register their device with the trusted service manager 505 only one time. Such registration may unlock a payment credential or CA certificate 424 (FIG. 4) pre-loaded on the device 400. Registration may include registering a biometric attribute, for example a thumb-print or finger-print, to unlock payment. All applications on the device may be registered with and deployed via the trusted service manager. Registering all applications with one trusted service manager may provide improved security for payment applications loaded and run on the device.

In an example embodiment, a user may unlock a payment credential 424 (FIG. 4) pre-loaded on device 400. In an example embodiment, the payment credential may be unlocked by registering the user's unique biometric profile using the biometric sensor 440 (FIG. 4). The credential 424 may be unlocked, for example, by registering a thumb-print twice using a thumb-print/finger print biometric sensor. In an example embodiment, all payment applications 450 (FIG. 4) may be registered and used using a common TSM signature.

In an example, when a customer invokes pre-loaded app 450 (FIG. 4), SCEP/CRMF (Simple Certificate Enrolment Protocol/Certificate Request Message Format) is invoked. A user's TSM credential or certificate 424 is entered and associated with the Service Provider's user account. A random counter may be generated by counter 444 (FIG. 4) on the Crypto SE and stored in the Crypto SE for counter based replay protection. In an alternative embodiment, clock 426 445 (FIG. 4) may generate a timestamp for timestamp-based replay protection. In an example embodiment, this information, for example a tuple, may be sent along with the SCEP and a certificate may be issued to the device.

Payment Account Number Deployment

In an example embodiment, payment account numbers may be deployed OTA. For example, a payment account number may be randomly generated by the Service Provider along with CVV (card verification value). In an example embodiment, a payment account number, CVV and counter/timestamp (to prevent replay attacks) may be encrypted using the Public key of the mobile phone and signed using the TSM's private key.

In an example embodiment, the counter may be checked and payment account number and CVV may be stored in the Crypto SE. The number may be obtained from the Service Provider separately, such as from a representative, either by phone, e-mail, or other method of inquiry.

Customer Manual Entry:

In an example embodiment, a customer may manually enter a known account number using a keypad on the device. This may be done only after activating the biometric credential and registering the device. The App may then load the Crypto SE with a payment instrument 447, identified by its account number.

Customer NFC Transaction

Figure 6A:
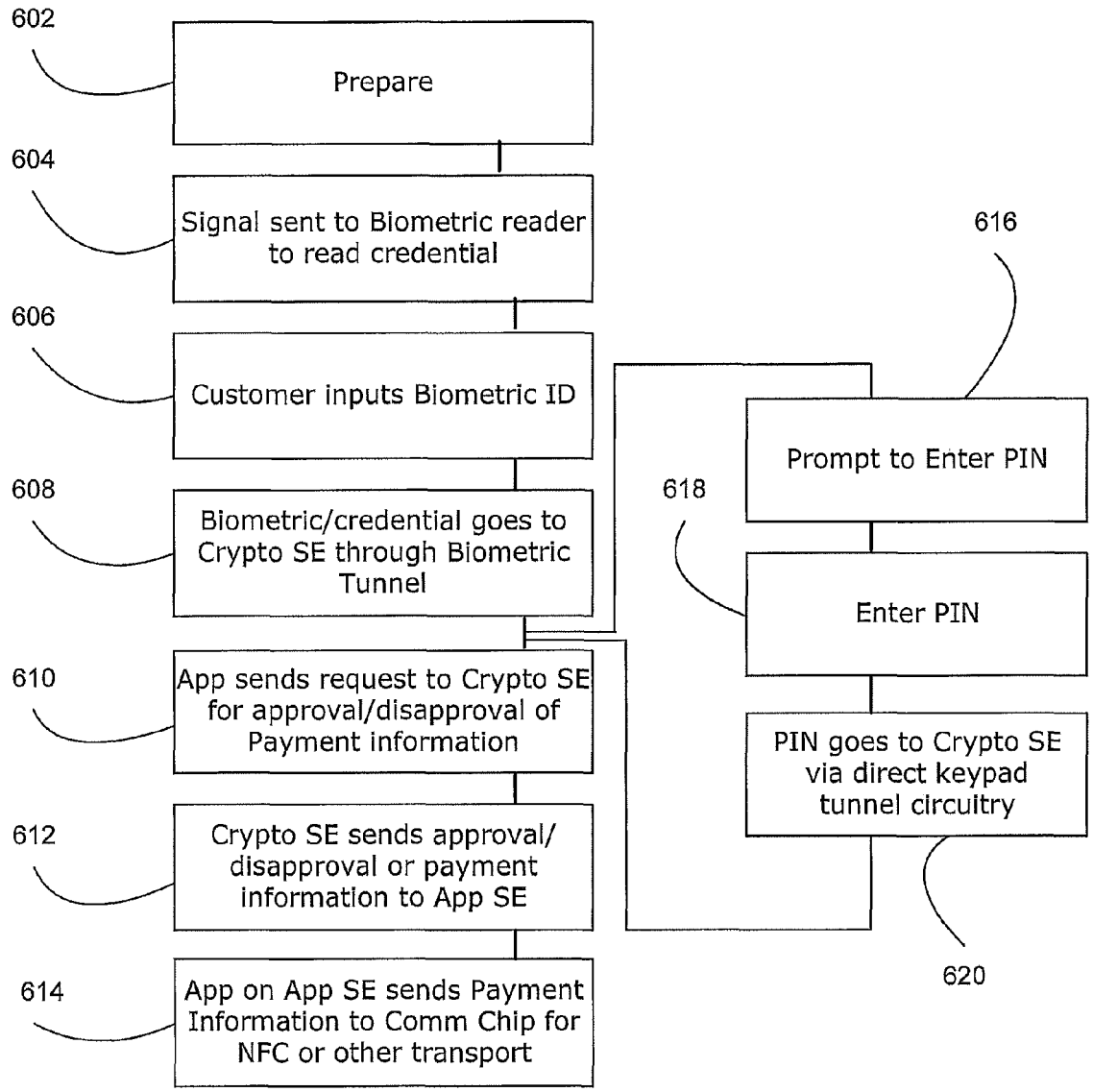
FIGS. 6a through 6c illustrate an exemplary embodiment of a method 600 of conducting a near-field communication (NFC) transaction at a point of sale (POS).
Figure 6B:
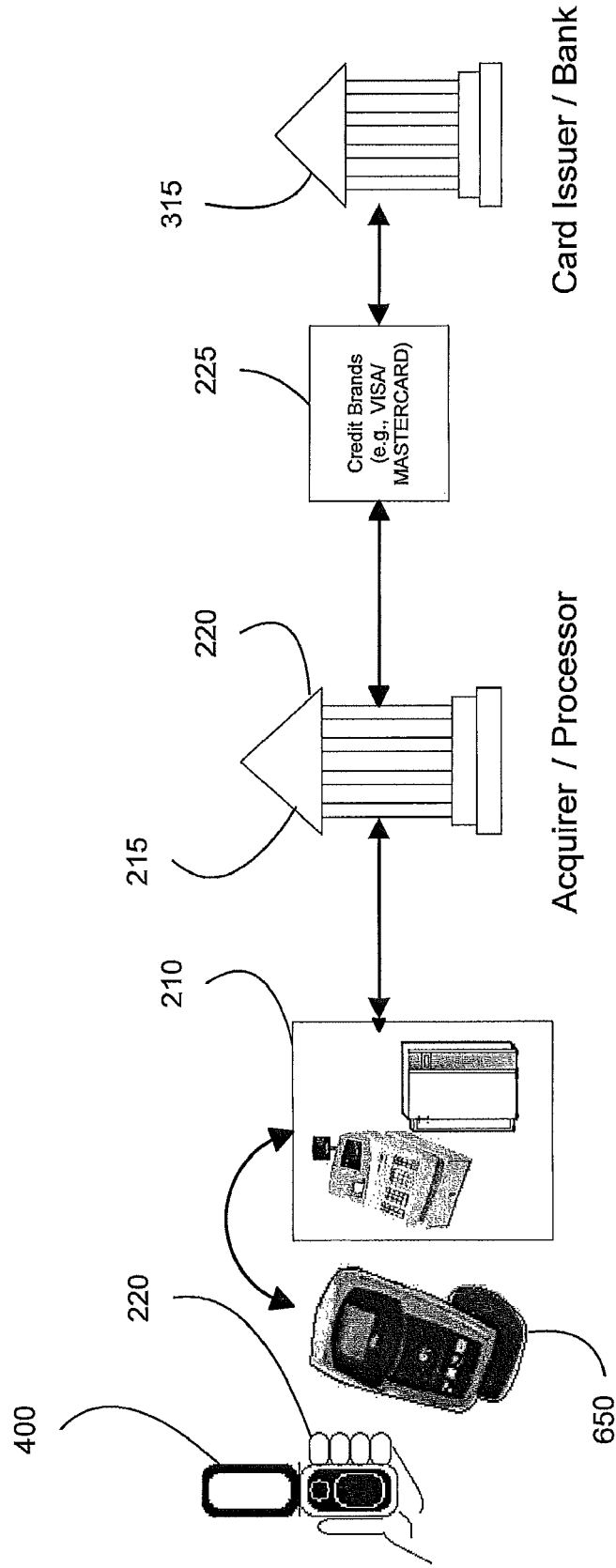
Figure 6C:
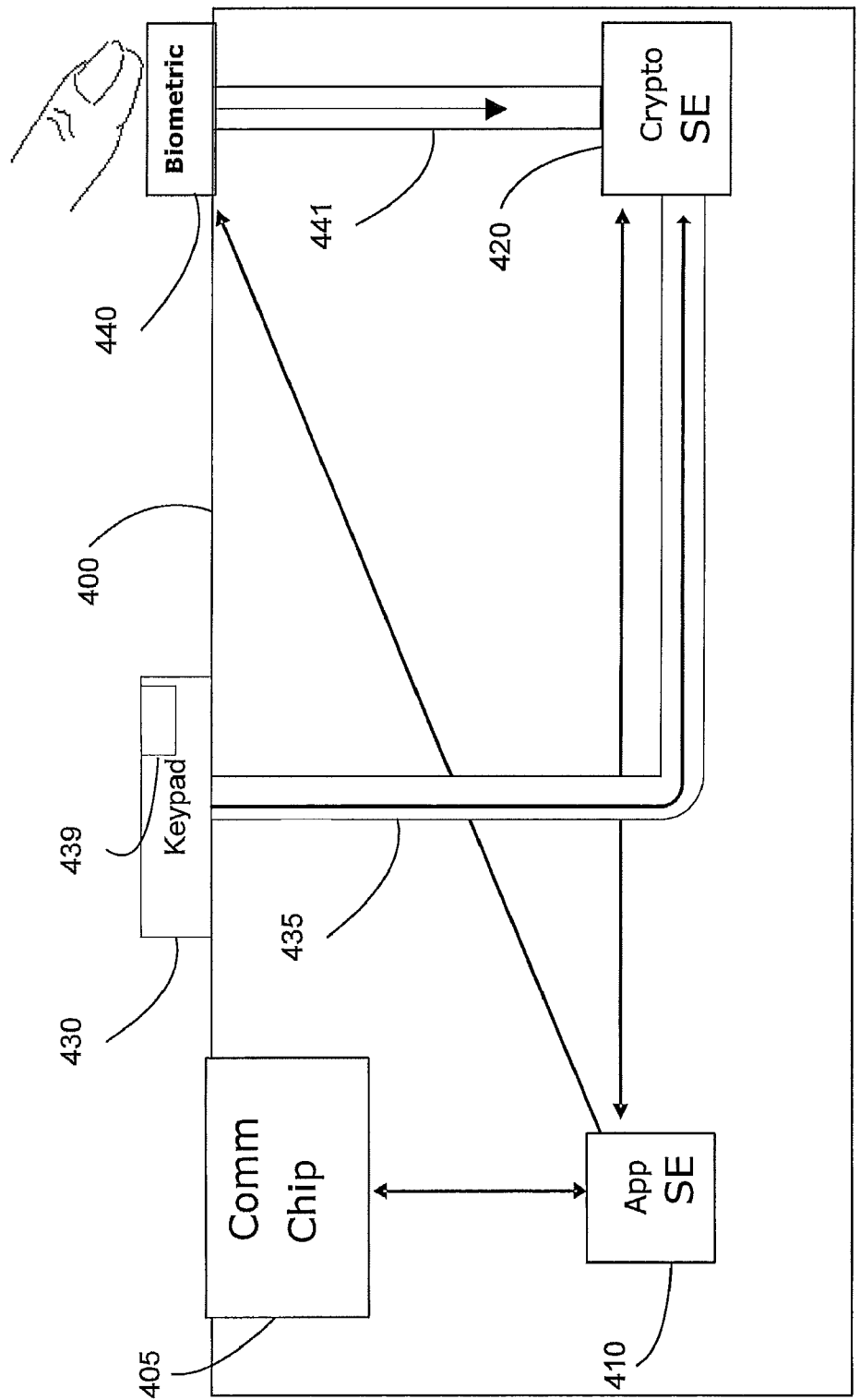

FIGS. 6a, 6b and 6c illustrate a method 600 of conducting a near-field communication (NFC) transaction at a point of sale (POS). A customer may prepare 602 device 400 for use. Preparing a device for use may include opening the device 400, taking the device in hand, selecting "payment mode," entering a payment application or other suitable method if the device does not need to be "opened" for use. For example, user 220 may select a payment mode or secure payment mode by pressing a payment mode button provided on the device 400 or otherwise appropriately selecting payment, for example by saying "Payment" or other word associated with such a function for a device with voice recognition technology or any other appropriate method of selection as appropriate for a particular device.

In an exemplary embodiment, preparing the device for payment may prompt a payment application resident on the App SE 410 of the device 400 to check 604 the biometric sensor for biometric input. A user may then input 606 their biometric identifying data (ID) or signature by placing or swiping a thumb or finger on biometric sensor 440. The input biometric ID may be directly sent or tunnelled 608 to Crypto SE 420 via provided tunnel circuitry 441. In an example embodiment, the tunnel circuitry 441 may be FIPS 140-2 level 3 compliant and may be arranged so that biometric ID is input directly into the Crypto SE for authentication/unlocking.

In an example embodiment, the application resident on the App SE 410 may send a message 610 to Crypto SE 420 for approval/disapproval of the payment and payment information in the event of approval. The Crypto SE may contain an Access Control System that may authenticate Applications in App SE for the types of requests Applications on the App SE 410 are entitled to perform. Once a user's biometric identity is authenticated properly, the Crypto SE 420 may send 612 an approval/disapproval message and payment or other information to the App SE. The App SE 410 may then send the payment information 614 to the communication chip 405 for further transmission or transport to a reader or other communication reception device located at the POS, for example a POS NFC reader located at a merchant/vendor's place of business.

In other example embodiments, the Crypto SE 420 may establish a direct, secure transmission between the Crypto SE 410 and the POS. The secure transmission may be established, for example, using technologies like Secure Socket Layer (SSL), Internet Protocol Security (IPSec) or regular symmetric/asymmetric encryption, if supported by the POS. In such embodiments, the payment instruments may also never be shown in clear in the App SE. If SSL or IPSec is used, a known Root CA may be stored in Crypto SE. The POS certificate may be issued using this Root CA. During the SSL or IPSec handshake, the certificate chain containing POS's certificate and Root CA is sent by POS to crypto SE directly. The Crypto SE may then work as an SSL/IPSec/Crypto Client. The Crypto SE may verify the POS's certificate against the Root CA that it already has. If the certificate matches, it may give payment information using an SSL/IPSec/secure channel.

The device 400 may transmit the information, for example by NFC technology, when the customer waves or taps the device on or near the POS reader 650. The Payment information may include payment information, such as amount and account number, and may include a CVV. In other embodiments, the payment information may be transmitted by alternate methods of communication as desired or necessary in a particular embodiment or circumstance, for example by SMS, discussed below.

When a payment is made at a merchant POS 650 using Visa/MC/AmEx, the last four digits of the payment instrument may be sent to the TSM (using, for example, an application provided on the App SE by the TSM). This information may be correlated with signature information, collated and offered to financial institutions like Banks, Visa/MC, as well as Charles Schwab, eTrade, Amazon as service by ensuring the privacy information is not leaked. The only information collected by the TSM may be the last four digits of the financial instrument and signature information. The TSM may collect and analyze such data and offer information developed through that analysis as a fraud engine. Signature information is used to identify the client device and its user.

Authentication to the Crypto Authorization Application Instead of on the POS

In an example embodiment, customer 220 may need to enter a PIN to complete a payment, for example where a debit card is used. Using a PIN may provide an additional level of security. In other embodiments, a PIN or other alpha-numeric code may be required and may be entered securely, in conjunction with biometric authentication or alone. A POS PIN may be entered directly onto keyboard 430 on device 400, instead of entering the PIN on a POS keypad or making a signature at a POS electronic signature screen.

In an example embodiment, a user may first authenticate their phone 602-608 for secure keyboard PIN entry by using the biometric sensor and biometric authentication application on their device, as discussed above. Biometric authentication of the phone may open or create the secure tunnel circuitry, directly from the keyboard to the Crypto SE, for secure keyboard entry on the device 400. A payment application on the App SE may prompt a user to enter a PIN 616, the user may enter a PIN 618, and the PIN may be tunneled 620 directly to the Crypto SE 420 via tunneling circuitry 441. The Crypto SE 420 may behave as Chip and PIN Authentication and/or as ARQC-ARPC. The secure entry mode may be initiated by pressing a payment or secure payment key 439 on the device

400, by biometric authentication of the device and/or by the payment application when entry of a PIN is required.

In some POS payment systems, the customer's PIN may otherwise be entered on a keypad attached to a card scanner or NFC reader or a signature made on a pressure-sensitive surface at the POS that electronically records a signature as a record of the authentication of the transaction, for example a credit card, electronic check or debit card transaction. Since banking regulations do not permit entering a PIN on a non-encrypted PIN pad, a client device with a secure payment mode with secure keyboard tunneling circuitry and a separate, dedicated Crypto SE may provide an acceptable, convenient and desirable means for making a debit card, credit card, electronic check or other transaction in which use of a secure PIN entry is required or desired.

In an example embodiment, a user may first authenticate the device biometrically and then be prompted to enter a PIN. When fully authenticated by the PIN and/or the biometric signature, the Crypto SE 420 may send 612 the payment information to the App SE 410 for forwarding via NFC or other communication mode. The entire payment may be made with the device "off", in other words when the cellular phone, WAP or other communications modes are disabled and only the NFC mode may be operational. In this way, a user may make a payment without turning a device completely on, which may be convenient on an airplane or other location where wireless telephone devices or other communications devices are required to be turned off or desired to be left off.

The payment information may be transmitted to the reader 650 at the POS, be forwarded further to and processed by merchant server 210, to acquirer/processor 215, 220, brands 225 and service provider (SP) 315, for example a card issuer or bank, to complete the payment transaction from an account of the user to the merchant/vendor in accordance with the payment information sent from the client device 400.

Secure SMS for Transaction

In an example embodiment, payments and financial transactions may be made using secure SMS communication. A TSM may generate a random key (AES-256 and SHA-512) and send the random key to a Crypto SE of a client device. The keys may be encrypted using the client device's public certificate and may be signed by the TSM. The keys may be sent over the SMS channel, for example through multiple SMSes. The client device may then verify the signature, decrypt the keys and store the keys in Crypto SE. The Crypto SE, in turn, may be able to generate, encrypt, and send encrypted SIMs to the TSM. The TSM may generate, or establish keys using the Diffie-Hellman (D-H) key exchange.

In an example embodiment, a user may desire to make payments using an SMS interface, where NFC is not available and where WAP is either unavailable or undesirable. Having a separate App SE and Crypto SE may enable secure SMS communication without those drawbacks. The TSM may preload a public key inside a Crypto SE, for example an SIM/SE. A client application on the App SE of a client device, with help of the Crypto SE, may generate a symmetric key and a MAC key. The application may then encrypt payload with the symmetric key and MAC key. The keys will be encrypted using the TSM's public key that can be then used to create a digital envelope. The size of an SMS is 160 characters total. If 1024 bits are used, then the binary value of data is 128 bytes. If the 128 bytes is Base 64 encoded, then the output is 171 bytes and there is no room to send the message itself. Hence Elliptic Curve Cryptography (ECC) may be used. ECC output is 24 bytes and Base 64 encoding this, the output is 32 bytes. The payload can be then less than 160−32=128 bytes. In an example embodiment, the client device may also be able to send secure SMS messages to one another as well.

Secure SMS may be implemented by a TSM in conjunction with various cell phone manufacturers, for example Nokia, with a SIM card and/or SE on mobile phones and ECC. The keys are dynamic and managed by hardware. In an example embodiment, when an SMS is sent, the data is encrypted using AES-256, and a counter is used for replay protection and SHA-512 HMAC is attached. SHA-512 HMAC is 64 bytes in binary. Truncation is used to bring the data to 32 bytes of BASE-64 encoding. The TSM may receive an SMS and determine to whom the message is to be sent or forwarded—and forward the message to the appropriate addressee, for example a Service Provider, to complete the payment transaction. The TSM may also have the keys registered for a recipient's device. The TSM may decrypt and re-encrypt the message using receiver phone's keys. Timestamps may be used to prevent replays. Keys may be rotated periodically using the SMS key establishment scheme.

In implementation of the various embodiments, the mobile device may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A method of making a contactless payment at a point of sale (POS), comprising:
   securely downloading a payment application to a first secure element of a client device from a trusted service manager (TSM), wherein the first secure element is programmed to download the payment application in response to determining that the payment application is signed by the TSM;
   registering the client device with the TSM only through a second secure element of the client device, exclusive of the first secure element, wherein:
      the second secure element is physically separate from the first secure element,
      the client device is registered with the TSM for authentication by registering a biometric signature using a biometric sensor of the client device;
   storing the biometric signature in the second secure element of the registered client device for authentication, wherein:
      the biometric signature is excluded from the first secure element;
   storing a security key in the second secure element of the registered client device, wherein:
      the security key is excluded from the first secure element;
   storing a payment instrument in the second secure element of the registered client device, wherein:
      the payment instrument is excluded from the first secure element;
   executing the payment application resident on the first secure element;
   signaling, by the payment application, a biometric sensor of the client device to sense a biometric feature;
   sensing, by the biometric sensor in response to the signaling from the payment application, the biometric feature;
   generating, in response to the sensing, biometric data representative of the biometric feature and sending the biometric data to the second secure element via a secure tunneling circuit,
   comparing the biometric data to the biometric signature stored in the second secure element,
   generating a secure payment information message in response to an authentication including a match of the biometric data with the stored biometric signature, wherein
      the secure payment information message is encrypted in accordance with the security key, and
      the secure payment information message includes the payment instrument; and
   transmitting the secure payment information message to a POS reader by one of near field communication (NFC), infrared, short range wireless connectivity, secure short message service (SMS), or direct secure communication from the second secure element to the POS.

2. The method according to claim 1, further comprising:
   entering an entered PIN on a keyboard of the client device, wherein the secure payment information message is generated if the entered PIN matches a stored PIN on the second secure element.

3. The method according to claim 1, wherein the secure payment information message is sent by a secure SMS, wherein when an SMS is sent, the message is encrypted using AES-256, and SHA-512 HMAC is attached.

4. The method according to claim 3, wherein the SHA-512 HMAC is 64 bytes in binary and truncation is used to bring data to 32 bytes of BASE-64 encoding.

5. The method according to claim 3, wherein a counter tags the secure payment information message for replay protection.

* * * * *